US 6,686,802 B2

(12) United States Patent
Maeda

(10) Patent No.: US 6,686,802 B2
(45) Date of Patent: Feb. 3, 2004

(54) MICROCOMPUTER HAVING BUILT-IN PHASE LOCKED LOOP CIRCUIT SYNCHRONIZED WITH EXTERNAL CLOCK AND DETECTING AN INTERRUPTION OF THE EXTERNAL CLOCK BY UTILIZING CONTINUOUS OUTPUTS OF THE PLL CIRCUIT

(75) Inventor: Shohei Maeda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/167,077

(22) Filed: Jun. 12, 2002

(65) Prior Publication Data

US 2003/0110407 A1 Jun. 12, 2003

(30) Foreign Application Priority Data

Dec. 7, 2001 (JP) ........................................ 2001-374251

(51) Int. Cl.[7] ................................................. H03L 7/00
(52) U.S. Cl. ........................................ 331/1 A; 331/74
(58) Field of Search .................. 331/1 A, 74; 327/156, 327/158, 159

(56) References Cited

U.S. PATENT DOCUMENTS 5,138,634 A * 8/1992 Knapp ........................ 375/354
5,926,640 A * 7/1999 Mason et al. ............... 713/320
6,161,187 A * 12/2000 Mason et al. ............... 713/322
6,369,625 B1 * 4/2002 Kanno ........................ 327/156

FOREIGN PATENT DOCUMENTS

| JP | 7-131446 | 5/1995 |
| JP | 7-235831 | 9/1995 |
| JP | 9-18306 | 1/1997 |

OTHER PUBLICATIONS

"Oscillation Stop Detection Function", M16C/6N Group, pp. 48–50, Japan.

* cited by examiner

Primary Examiner—Robert Pascal
Assistant Examiner—Joseph Chang
(74) Attorney, Agent, or Firm—Burns, Doane, Swecker & Mathis, LLP

(57) ABSTRACT

In the microcomputer with a phase-locked loop (PLL) circuit incorporated, a counter is cleared when an edge detection signal of an edge detector which receives an externally generated clock signal from outside and detects an edge of the clock signal, performs a count operation of an internal clock signal output from the PLL circuit as a count source, and output a count value. When the count value of the counter exceeds a predetermined set value, the PLL incorporated microcomputer detects that the externally generated clock signal has been interrupted, and outputs an external clock stop detection signal.

4 Claims, 4 Drawing Sheets

MICROCOMPUTER HAVING BUILT-IN PHASE LOCKED LOOP CIRCUIT SYNCHRONIZED WITH EXTERNAL CLOCK AND DETECTING AN INTERRUPTION OF THE EXTERNAL CLOCK BY UTILIZING CONTINUOUS OUTPUTS OF THE PLL CIRCUIT

FIELD OF THE INVENTION

The present invention relates to a phase-locked loop (PLL) incorporated microcomputer provided with a circuit which detects an interruption of an oscillation of an external oscillator, as a clock source of the microcomputer, which is externally connected to the microcomputer.

BACKGROUND OF THE INVENTION

In a microcomputer system employed in a machine such as automobile that is responsible for human life, the concept of fail-safe is an important point as well as high reliability. The fail-safe is directed for detecting an abnormality when a portion of a system is in an abnormal state, and conducting switching to appreciate an auxiliary unit. One example of such abnormal states is an interruption of oscillation of an external oscillator of a microcomputer. The interruption of oscillation of the external oscillator occurs due to an open, short-circuit, or the like of the external oscillator.

A mechanism as follows is mounted on a Microcomputer M16C/6N group or the like manufactured by MITSUBISHI ELECTRIC CORPORATION. The mechanism is such that when an interruption of oscillation of the external oscillator occurs, the microcomputer detects the interruption and an internal clock is switched from a connection terminal of the external oscillator to an internal oscillator such as an internal ring oscillator.

FIG. 5 is a configuration diagram of a conventional oscillation stop detector. The oscillation stop detector is incorporated in a chip of a microcomputer. A clock edge detector 100 detects an edge of an externally generated clock signal XIN input from a connection terminal of an external oscillator, and generates a charge/discharge control pulse signal in response to the detection. A charger/discharger 101 performs an operation which gradually charges a charger having an RC time constant, and an operation which discharges according to the charge/discharge control pulse signal. When the externally generated clock signal XIN is normally oscillated, discharging according to the charge/discharge control pulse signal is periodically performed before the charging is completed. However, when the externally generated clock signal XIN is interrupted, the charge/discharge control pulse signal is not also generated. Therefore, discharging is not performed in the charger/discharger 101 and thereby charging is completed. The charger/discharger 101 detects the completion of the charging as an interruption of oscillation of the external oscillator, and generates an oscillation-stop interruption signal or the like in response to the detection.

Further, a switching section 103 switches a main clock of the microcomputer from the externally generated clock signal XIN to an oscillation signal of an internal ring oscillator 102 based on the oscillation-stop interruption signal, which enables the microcomputer to operate even after the externally generated clock signal XIN is interrupted. Therefore, it becomes possible to perform a necessary fail-safe processing.

The charger/discharger 101 used in the conventional oscillation stop detector is configured with a resistor R and a capacitor C. Particularly the capacitor C occupies a large area in terms of the layout, which prevents an area of a chip from being reduced. Further, the ring oscillator circuit serving as an internally generated clock oscillation source, which is used only when an interruption of oscillation is detected, is required excessively. The time constant of the RC is largely varied due to changes of a manufacturing process or a usage condition of a semiconductor, and it is thereby necessary to carefully perform tuning in terms of the layout in order to detect an accurate interruption of oscillation, which may lead to mistakes of the layout.

On the other hand, some one-chip microcomputers are of PLL incorporated type. In the PLL incorporated one-chip microcomputer, a clock signal from the external oscillator or an internal reference oscillator is input to the PLL circuit. The PLL circuit comprises a phase comparator, a charge pump, a voltage-controlled oscillator (VCO), and a frequency divider. The PLL circuit performs a phase synchronization of the input clock signal and an internally generated clock signal, generates a fast clock signal by multiplying the phase-synchronized clock signal by n, and outputs the fast clock signal as an internal clock signal used in the microcomputer.

The conventional PLL incorporated one-chip microcomputer is internally provided with another clock signal generator in order to cope with an abnormality of an externally generated clock signal from the external oscillator, so that switching is performed from an internal clock signal output from the PLL circuit to a clock signal from another internal clock signal generator, when the externally generated clock signal is abnormal.

In the conventional art, however, it is necessary to internally provide another clock signal generator which is used only when the external oscillator detects an interruption of oscillation, which results in increase of the number of circuit configurations.

As described above, according to the oscillation stop detector based on the former conventional art, there is a problem that the RC time constant is largely varied due to manufacturing process or usage condition of a semiconductor. Further, there is a problem that the layout area is increased in order to secure a large RC time constant and incorporate a dedicated internally generated clock oscillation source.

Further, according to the PLL-incorporated one-chip microcomputer based on the latter conventional art, it is necessary to internally provide another clock signal generator which is used only when an interruption of oscillation of the external oscillator is detected, which results in upsizing of the circuit configuration and increase in the occupied circuit area, thereby preventing an area of a chip from being reduced.

SUMMARY OF THE INVENTION

It is an object of this invention to provide a phase-locked loop (PLL) incorporated microcomputer capable of accurately detecting an interruption of oscillation of the external oscillator, and capable of forming an oscillation stop detector for the external oscillator with a simple configuration and a small occupied circuit area.

The PLL incorporated microcomputer according to this invention comprises an edge detector, a PLL circuit, a counter, and an externally generated clock signal stop detector. More specifically, the edge detector detects an edge of an input externally generated clock signal and generates an edge detection signal. The PLL circuit generates a clock signal, phase-synchronizes the clock signal with the externally generated clock signal and generates a phase-synchronized signal, and multiplies the phase-synchronized signal by n to output the multiplied signal as an internal clock signal used in the microcomputer. The counter is cleared when the edge detector outputs the edge detection signal, performs a count operation using an internal clock signal output from the PLL circuit as a count source, and outputs a count value. The externally generated clock signal stop detector detects that the externally generated clock signal is interrupted when the count value of the counter has exceeded a predetermined set value, and outputs an external clock stop detection signal.

This invention is based on the feature such that a PLL circuit continues oscillation with a particular low frequency by an incorporated voltage-controlled oscillator (VCO) even when a clock signal to be input is interrupted.

According to the above aspect, the internal clock signal output from such a PLL circuit becomes a signal n times the externally generated clock signal when the externally generated clock signal is normal, and the signal becomes a signal with a particular low frequency when the externally generated clock signal is abnormal.

Other objects and features of this invention will become apparent from the following description with reference to the accompanying drawings.

DETAILED DESCRIPTIONS

An embodiment of the PLL incorporated microcomputer according to this invention will be explained below with reference to the drawings.

Figure 1:
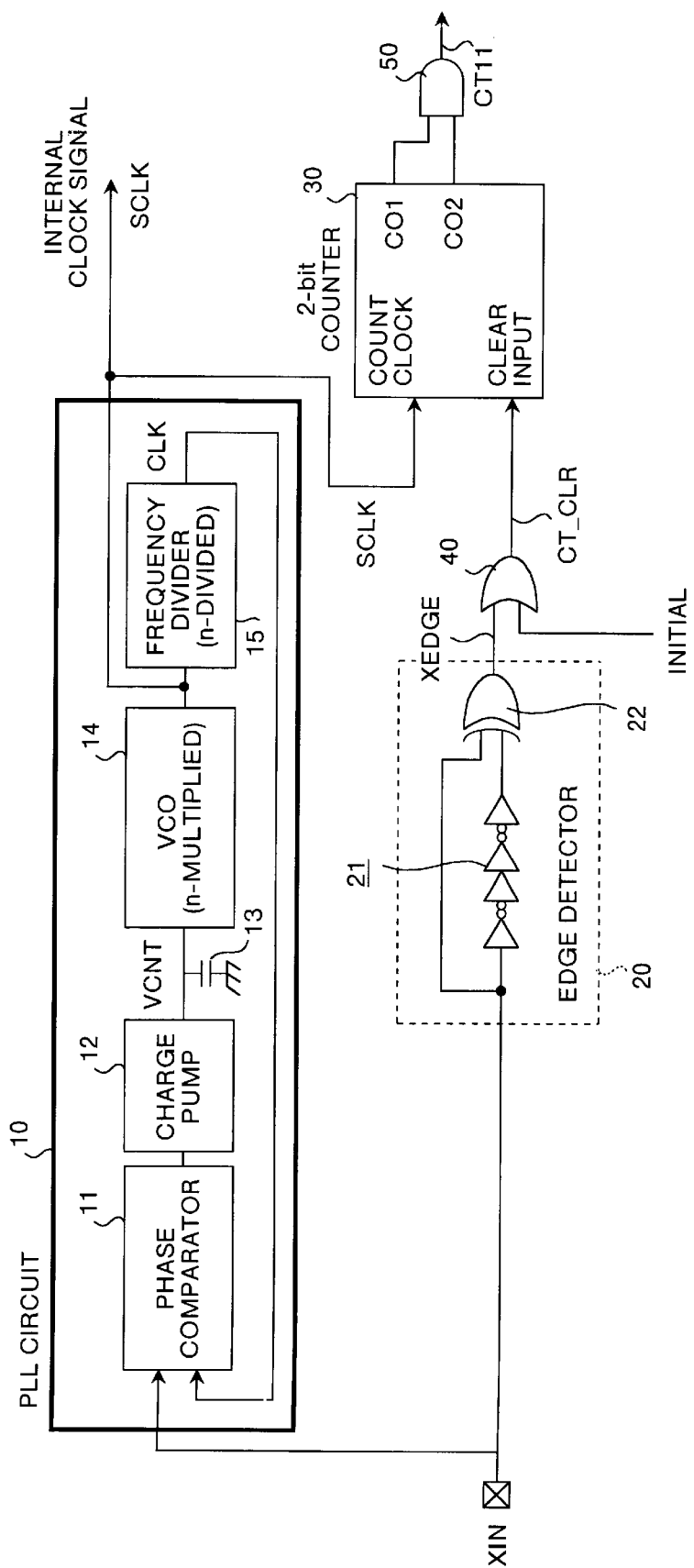
FIG. 1 is a circuit block diagram which shows an embodiment of the PLL incorporated microcomputer according to the present invention.

FIG. 1 shows the embodiment of an external oscillation stop detector in the PLL incorporated microcomputer according to this invention. The external oscillation stop detector shown in FIG. 1 is mounted on a one-chip microcomputer with PLL incorporated.

The external oscillation stop detector shown in FIG. 1 comprises a PLL circuit 10 to which an externally generated clock signal XIN input from a connection terminal of an external oscillator (not shown) is input, and an edge detector 20 which detects an edge of the externally generated clock signal XIN and outputs an edge detection signal XEDGE. The external oscillation stop detector also comprises an OR circuit 40 which ORs the edge detection signal XEDGE and an initial signal INITIAL, a counter 30 where an internal clock signal SCLK output from a VCO 14 of the PLL circuit 10 is input as a count source to a count clock terminal and where an output CT_CLR of the OR circuit 40 is input to a clear terminal, and an externally generated clock signal stop detector 50 configured with an AND circuit which ANDs 2-bit outputs of the counter 30.

The edge detector 20 has a delay circuit 21 which delays the externally generated clock signal XIN, and an exclusive OR gate 22 which exclusively ORs the externally generated clock signal XIN and an output of the delay circuit 21. The edge detector 20 detects both edges (fall edge and rise edge) of the externally generated clock signal XIN with the above configuration, and outputs the edge detection signal XEDGE which is, for example, at a high logical level ("H") when the both edges are detected.

The OR circuit 40 ORs the edge detection signal XEDGE and the initial signal INITIAL asserted at a system reset, and inputs the output CT_CLR to the clear terminal of the counter 30.

The PLL circuit 10 comprises a phase comparator 11, a charge pump 12, a capacitor 13, a voltage-controlled oscillator (VCO) 14, and a frequency divider 15. The phase comparator 11 compares a phase of a clock signal CLK output from the frequency divider 15 of the PLL circuit 10 with a phase of the externally generated clock signal XIN input from the connection terminal of the external oscillator. The phase comparator 11 outputs a signal indicating that the phase advances or a signal indicating that the phase delays according to a shift of the phase, to the charge pump 12. The charge pump 12 charges or discharges electric charges to the capacitor 13 according to the phase advance signal or the phase delay signal.

As a result of the phase comparison in the phase comparator 11, when an oscillation frequency of the output clock signal CLK of the PLL circuit 10 is lower than a frequency of the externally generated clock signal XIN, the pair of the phase comparator 11 and the charge pump 12 operates in a direction of injecting electric charges into the capacitor 13 of an output node, i.e., in the direction of increasing a potential VCNT of an output node. On the contrary, when an oscillation frequency of the output clock signal CLK of the PLL circuit 10 is higher than a frequency of the externally generated clock signal XIN, the pair of the phase comparator 11 and the charge pump 12 operates in a direction of extracting electric charges from the capacitor 13 of the output node, i.e., in the direction of lowering the potential VCNT of the node.

The voltage-controlled oscillator (VCO) 14 is an oscillator which outputs a frequency according to the output voltage VCNT, i.e., potential of the node, of the charge pump 12. The VCO 14 outputs an oscillation signal in which the oscillation frequency becomes higher when the potential VCNT is high, and the oscillation frequency becomes lower when the potential VCNT is low. The oscillation signal is output as the internal clock signal SCLK, and is used in each circuit such as a CPU (not shown) in the microcomputer. The internal clock signal SCLK output from the VCO 14 is n-divided (in this case, n is 2) with the frequency divider 15 to be input to the phase comparator 11 and compared with the externally generated clock signal XIN in terms of the phases thereof.

Since the frequency divider 15 for n-dividing an output of the VCO 14 is inserted into this feedback loop, the phase comparator 11 compares a signal having a frequency 1/n output of the VCO 14, as a comparison signal, with the externally generated clock signal XIN so that the phases of the signals are synchronized. As a result, the internal clock signal SCLK which is synchronously oscillated with a frequency of n times (in this case, n is 2) the externally generated clock signal XIN can be finally obtained.

Figure 2:
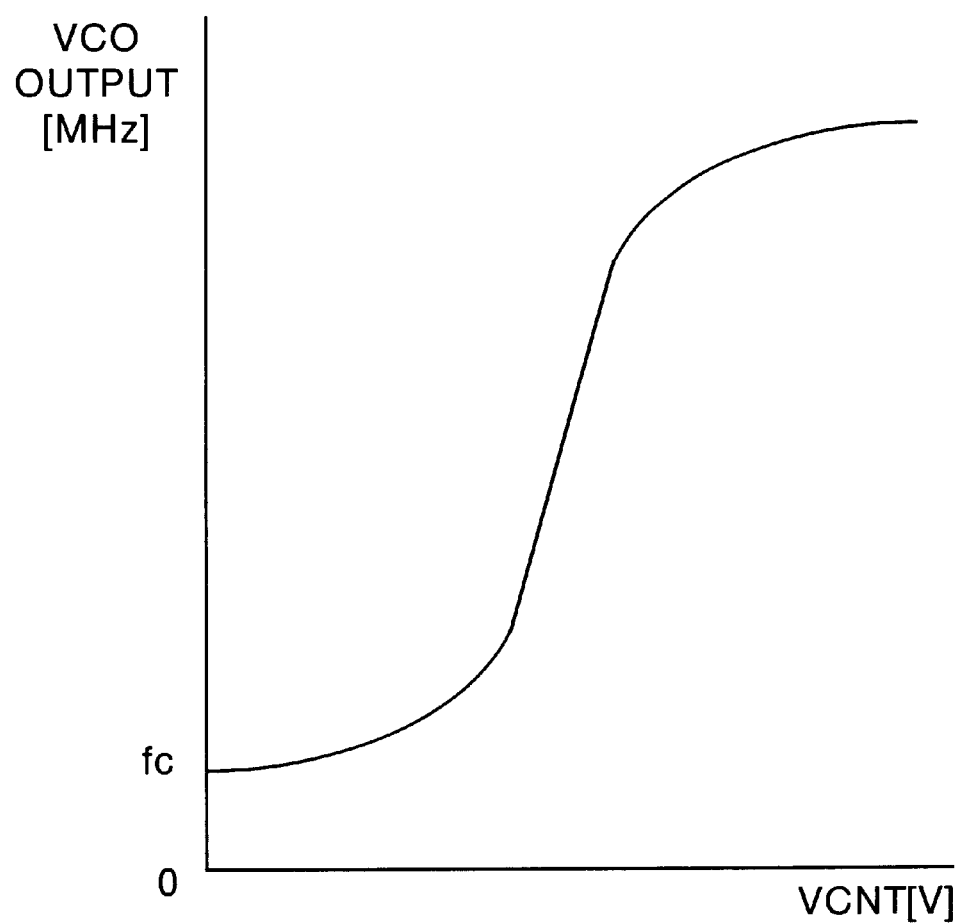
FIG. 2 is a graph which shows a relationship between a VCO input VCNT and a VCO output.

A graph shown in FIG. 2 shows a general characteristic of the VCO 14. The characteristic to be noted is that the VCO 14 continues oscillation with a particular low frequency fc even when the input voltage VCNT becomes a ground level. Therefore, an oscillation signal with a particular frequency fc can be extracted from the PLL circuit 10 even when the externally generated clock signal XIN is interrupted.

The counter 30 is configured with a 2-bit counter in this case. The counter 30 performs count-up based on the internal clock signal SCLK as a count source, and is cleared based on an edge of the externally generated clock signal XIN or the initial signal INITIAL asserted at a system reset. In this case, the VCO 14 generates the internal clock signal SCLK twice the externally generated clock signal XIN, and the edge detector 20 detects both edges of the externally generated clock signal XIN, so that the edge detection signal XEDGE (CT_CLR) from the edge detector 20 is generated one time per one cycle of the internal clock signal SCLK.

The externally generated clock signal stop detector 50 outputs an external clock stop detection signal CT11 when both the 2-bit outputs of the counter 30 become "H". When the external clock stop detection signal CT11 is generated, it is determined that the externally generated clock signal XIN has been interrupted. The external clock stop detection signal CT11 is utilized to set a CPU readable status flag or generate a reset interruption with respect to the CPU, which enables to notify the CPU that an oscillation of the externally generated clock signal XIN has been interrupted.

Figure 3:
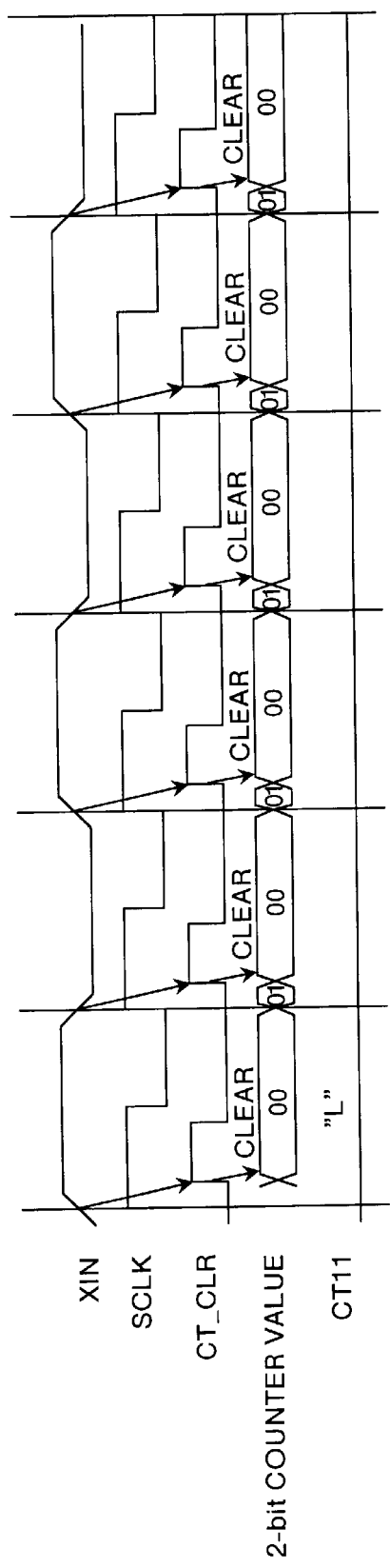
FIG. 3 is a time chart which shows operations of respective sections when an externally generated clock signal XIN is normally oscillated.
Figure 4:
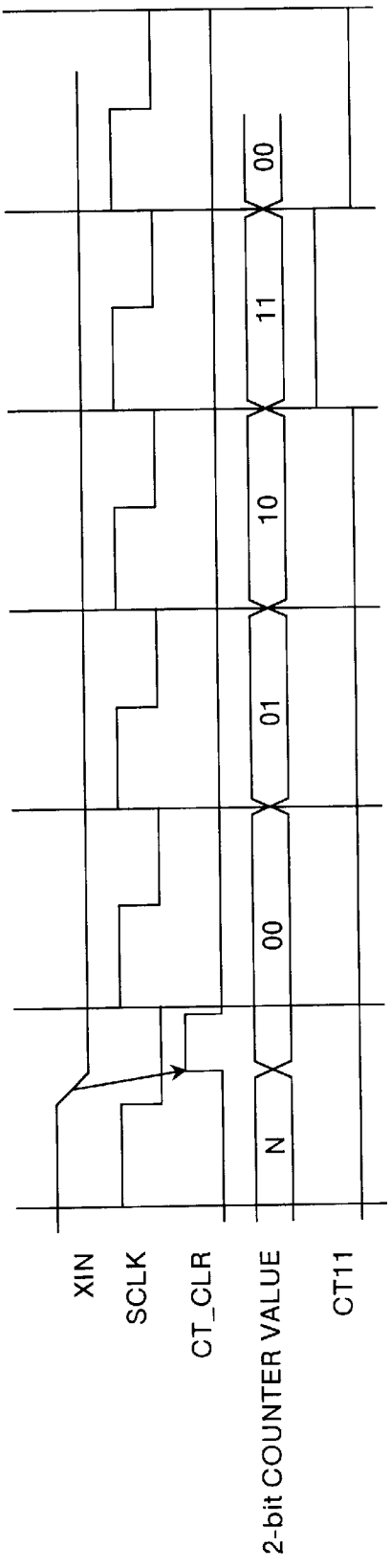
FIG. 4 is a time chart which shows operations of the respective sections when the externally generated clock signal XIN is interrupted.
Figure 5:
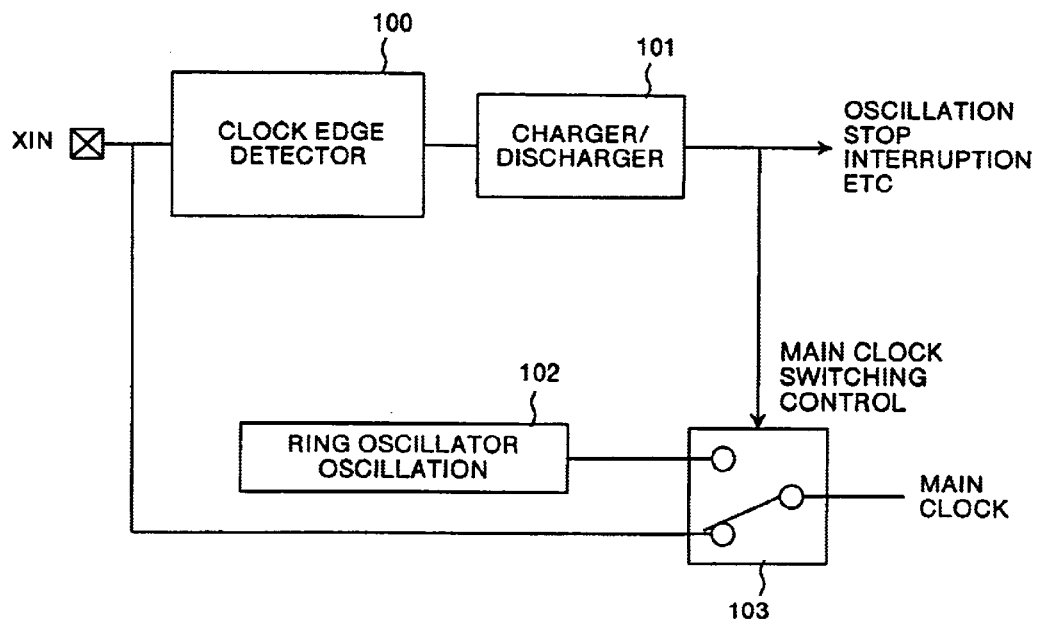
FIG. 5 is a diagram which shows the conventional art.

Operations of the respective sections shown in FIG. 1 will be explained below according to the time charts shown in FIGS. 3 and 4. With reference to FIG. 3, how the operation is performed when the externally generated clock signal XIN is normally oscillating, is explained first.

As shown in FIG. 3, the VCO 14 generates the internal clock signal SCLK twice the externally generated clock signal XIN, and the edge detector 20 detects both edges of the externally generated clock signal XIN. Therefore, the edge detection signal XEDGE (CT_CLR) from the edge detector 20 is generated one time per one cycle of the internal clock signal SCLK. Accordingly, the counter 30 repeats the operation of performing a transition of 00 to 01 and clearing 01 immediately after 01 is reached. Since the external clock stop detection signal CT11 is a signal which becomes "H" when a value of the counter 30 becomes "11", the externally generated clock signal XIN shown in FIG. 4 is always at a low logical level ("L") in a normal state.

An operation when the externally generated clock signal XIN is interrupted will be explained below with reference to FIG. 4. When an oscillation of the externally generated clock signal XIN is interrupted, the charge pump 12 operates in a direction of lowering the potential VCNT. However, as shown in the graph of FIG. 2, even if the potential VCNT is lowered to the ground level, the internal clock signal SCLK is not interrupted, and the counter 30 continues to count up. After a predetermined time has lapsed (in this case, after a lapse of 3 clocks after the externally generated clock signal XIN is interrupted), the counter output becomes "11", and the external clock stop detection signal becomes "H". The external clock stop detection signal CT11 is utilized to set the CPU readable status flag or generate the reset interruption with respect to the CPU, which enables to notify the CPU that the externally generated clock signal XIN has been interrupted. Further, since the internal clock signal SCLK continues to oscillate, even if the externally generated clock signal XIN is interrupted, the CPU can continue to operate without particularly switching to another internal clock signal, thereby an appreciate measure for fail-safe can be taken.

In the embodiment, the example of generating the externally generated clock signal XIN after a lapse of 3 clocks after the clock signal XIN has been interrupted, has been explained. If the number of bits of the counter is increased and a timing of generating the external clock stop detection signal CT11 can arbitrarily be selected, it is possible to set an arbitrary clock number such as 4, 5, 6, . . . as a wait time.

According to the embodiment, when a count value of the counter 30, cleared when the edge detector 20 outputs an edge detection signal, exceeds a predetermined set value, this fact is detected as a stop of the external clock signal XIN, and the external clock stop detection signal CT11 is output. Therefore, only by adding the edge detector 20 and the counter 30 to the PLL incorporated microcomputer, it is possible to detect an interruption of the externally generated clock signal XIN with such a remarkably simple configuration and a small-occupied area. Further, it is possible to take the measure for fail-safe required when the externally generated clock signal XIN is interrupted, without internally providing another reference oscillation source. Furthermore, it is possible to detect a stop of the externally generated clock signal XIN without losing the original PLL functions such as phase synchronization and generation of the multiplied signal.

As explained above, according to the present invention, in the PLL incorporated microcomputer, when a count value of the counter, which is cleared when the edge detector outputs the edge detection signal and which performs a count operation utilizing an internal clock signal output from the PLL circuit as a count source, exceeds a predetermined set value, this fact is detected as an interruption of the externally generated clock signal and the external clock stop detection signal is output. Therefore, it is possible to reliably detect an interruption of the externally generated clock signal with a remarkably simple configuration in which the edge detector and the counter are added and with a small-occupied area. Further, it is possible to take a measure for fail-safe required when the externally generated clock signal is interrupted, without internally providing another reference oscillation source. Furthermore, it is possible to detect an interruption of the externally generated clock signal without losing the original PLL functions such as phase synchronization and generation of the multiplied signal.

Moreover, the reset interruption is generated based on the external clock stop detection signal output from the externally generated clock signal stop detector, which enables to reliably notify the CPU and the like that the externally generated clock signal has been interrupted.

Furthermore, the CPU readable predetermined status flag is set by the external clock stop detection signal output from the externally generated clock signal stop detector, which enables to reliably notify the CPU that the externally generated clock signal has been interrupted.

Moreover, a set value in the externally generated clock signal stop detector can be set to a programmable value, which enables to generate the external clock stop detection signal at the time when an arbitrary time has lapsed from the time when the externally generated clock signal has been interrupted.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A phase-locked loop incorporated microcomputer comprising:

an edge detector which receives an externally generated clock signal from outside and detects an edge of the externally generated clock signal and outputs an edge detection signal;

a phase-locked loop circuit which generates a clock signal, phase-synchronizes the generated clock signal with the externally generated clock signal and generates a phase-synchronized signal, and multiplies the phase-synchronized signal by n to output as an internal clock signal used in a microcomputer;

a counter which is cleared when the edge detector outputs the edge detection signal, performs a count operation utilizing the internal clock signal output from the phase-locked loop circuit as a count source, and outputs a count value; and an externally generated clock signal stop detector which detects that the externally generated clock signal is interrupted when the count value output from the counter has exceeded a threshold value, and outputs an external clock stop detection signal that indicates that the externally generated clock signal has been interrupted.

2. The microcomputer according to claim 1, wherein a reset interruption is generated based on the external clock stop detection signal.

3. The microcomputer according to claim 1, wherein a predetermined status flag readable by a central processing unit is set based on the external clock stop detection signal.

4. The microcomputer according to claim 1, wherein the threshold value with which the externally generated clock signal stop detector compares the count value output from the counter is a programmable value.

* * * * *